United States Patent
Draxler et al.

(10) Patent No.: US 10,859,117 B2
(45) Date of Patent: Dec. 8, 2020

(54) METHOD OF FORMING A POWDER METAL INSERT HAVING A HORIZONTAL THROUGH HOLE

(71) Applicant: GKN Sinter Metals, LLC, Auburn Hills, MI (US)

(72) Inventors: Gary R. Draxler, Slinger, WI (US); Joel H. Mandel, Hartford, WI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 0 days.

(21) Appl. No.: 16/490,346

(22) PCT Filed: Mar. 7, 2018

(86) PCT No.: PCT/US2018/021283
§ 371 (c)(1),
(2) Date: Aug. 30, 2019

(87) PCT Pub. No.: WO2018/165251
PCT Pub. Date: Sep. 13, 2018

(65) Prior Publication Data
US 2020/0072280 A1    Mar. 5, 2020

Related U.S. Application Data

(60) Provisional application No. 62/469,370, filed on Mar. 9, 2017.

(51) Int. Cl.
*F16C 35/02*     (2006.01)
*F16C 33/14*     (2006.01)
(Continued)

(52) U.S. Cl.
CPC ............ *F16C 33/145* (2013.01); *B22D 19/00* (2013.01); *B22F 5/10* (2013.01); *B22F 2998/10* (2013.01); *F16C 2360/00* (2013.01)

(58) Field of Classification Search
CPC ........ F16C 9/02; F16C 33/128; F16C 33/145; F16C 35/02; F16C 2220/20;
(Continued)

(56) References Cited

U.S. PATENT DOCUMENTS 4,087,221 A    5/1978  Munson et al.
4,908,923 A *  3/1990  Anderson ............. F02F 7/0053
                                                            164/103
(Continued)

FOREIGN PATENT DOCUMENTS

JP    S4898503 U    11/1973
JP    S6063301 A    4/1985
(Continued)

OTHER PUBLICATIONS

PCT International Search Report and Written Opinion, PCT/US2018/021283, dated May 25, 2018, 17 pages.

*Primary Examiner* — Phillip A Johnson
(74) *Attorney, Agent, or Firm* — Quarles & Brady LLP

(57) ABSTRACT

A powder metal bearing support insert for casting into an engine component includes a pair of holes formed by interdigitated slots during a powder metal compaction process. Since they are formed by interdigitated slots, this pair of holes may receive the cast material therein during the casting step. Among other things, the cast material in these holes may be drilled or machined using tools graded to work the material of the casting in contrast to the material of the insert.

14 Claims, 3 Drawing Sheets

(51) Int. Cl.
*B22D 19/00* (2006.01)
*B22F 5/10* (2006.01)

(58) Field of Classification Search
CPC .... F16C 2360/22; B22D 19/00; F02F 7/0053; F02F 7/2007; F02F 7/0056; F02F 7/009; F02F 2200/06; F02F 2200/08
See application file for complete search history.

(56) References Cited

U.S. PATENT DOCUMENTS

| | | | |
|---|---|---|---|
| 5,039,292 A | 8/1991 | Tanigawa et al. | |
| 5,378,416 A | 1/1995 | Kishi et al. | |
| 5,403,373 A | 4/1995 | Kitagawa et al. | |
| 5,501,529 A | 3/1996 | Cadle et al. | |
| 5,698,149 A | 12/1997 | Hinzmann et al. | |
| 5,769,546 A * | 6/1998 | Wuest | F02F 7/0053 384/273 |
| 5,800,902 A | 9/1998 | Shimmell et al. | |
| 6,080,358 A | 6/2000 | Oba et al. | |
| 6,422,755 B1 | 7/2002 | Cadle et al. | |
| 6,645,426 B1 | 11/2003 | Yoshihara et al. | |
| 7,566,504 B2 * | 7/2009 | Oda | B22D 19/00 428/577 |
| 7,625,522 B2 | 12/2009 | Cooper | |
| 7,753,592 B2 * | 7/2010 | Neto | F16C 9/02 384/293 |
| 8,210,749 B2 | 7/2012 | Mandel et al. | |
| 8,336,425 B2 * | 12/2012 | Mandel | B22D 19/14 74/579 E |
| 9,995,367 B2 | 6/2018 | Chottiner et al. | |

FOREIGN PATENT DOCUMENTS

| | | |
|---|---|---|
| JP | S6074896 U | 5/1985 |
| JP | S60141999 U | 9/1985 |
| JP | H06246497 A | 9/1994 |
| JP | H07148597 A | 6/1995 |
| JP | H10128595 A | 5/1998 |
| JP | H10146695 A | 6/1998 |
| JP | 2000071099 A | 3/2000 |
| JP | 2002045998 A | 2/2002 |

* cited by examiner

METHOD OF FORMING A POWDER METAL INSERT HAVING A HORIZONTAL THROUGH HOLE

CROSS-REFERENCE TO RELATED APPLICATION

This application represents the national stage entry of International Application No. PCT/US2018/021283 filed Mar. 7, 2018, and claims the benefit of the filing date of U.S. Provisional Patent Application No. 62/469,370 entitled "Method of Forming a Powder Metal Insert Having a Horizontal Through Hole" filed on Mar. 9, 2017, which is hereby incorporated by reference for all purposes as if set forth in its entirety herein.

STATEMENT OF FEDERALLY SPONSORED RESEARCH OR DEVELOPMENT

Not applicable.

FIELD OF THE INVENTION

This disclosure relates to parts made using powder metallurgy and, in particular, to powder metal parts which are used as cast-in inserts.

BACKGROUND

In certain applications, powder metal inserts are cast into place within a larger non-powder metal body. As one example, ferrous powder metal inserts may be cast into a structural part of an engine in which the structural part is cast aluminum. These powder metal inserts may define portions of an opening for receiving a bearing, such as a crankshaft bearing, in conjunction with a bearing cap. One example of such a cast-in powder metal insert can be found in U.S. Pat. No. 5,501,529.

The particular structure and component into which the powder metal insert is cast may depend upon the overall structural arrangement of the engine. In some forms, the powder metal bearing support insert may be cast into a bedplate which, in turn, is bolted to a part of the engine casing. However, in other forms, the powder metal bearing support inserts could be cast directly into the engine block. These arrangements are exemplary in nature and the particular structural arrangement and nomenclature of the parts may vary based on engine design.

SUMMARY

Disclosed herein are improvements to powder metal bearing support inserts for casting into engine components. The powder metal bearing supports can be formed to have unique holes formed during the compaction process in which the holes are formed by interdigitated slots that abut one another. The manner in which these holes are structurally formed and defined permits the cast material to flow into and fill the holes during the casting process. Since the cast material may be more easily machined or drilled than the material of the powder metal bearing support, this permits improved ease of drilling bolt holes through the space of the holes and permits the drilling to be performed using similar machining tools to the tools that may be used in machining the rest of the cast engine component (in contrast to a drill bit designed to machine through the material of the insert, which may be more difficult and hard to machine).

Still yet, from the standpoint of production of the powder metal part, the holes of the disclosed powder metal bearing support insert may be formed during compaction with the insert being generally laid flat in the tool and die set. The flat or horizontal orientation is usually a preferred orientation for compaction because most of the component is uniformly thick, which minimizes density variations in the compact and final sintered product. Because the tools conventionally compact the powder metal in a uniaxial fashion, when the part is horizontal and when the holes extend in a horizontal direction, a conventional vertical core rod cannot be used to produce the holes and so holes would need to have been formed post-compaction (either during subsequent processing of the compact or sintered part before casting the insert into the engine component or at a drilling step after casting, at which point the final bolt hole is being drilled rather than an opening to accommodate the drilling of a bolt hole therein).

According to one aspect, a powder metal bearing support insert for casting into an engine component is disclosed. The powder metal bearing support insert includes a body having pair of opposing ends on lateral sides of the body, a bearing-receiving surface positioned on a side of the body between the pair of opposing ends (in which the bearing-receiving surface is adapted for reception of a bearing in the bearing-receiving surface), and a pair of holes extending through the body in which each of the pair of holes are formed by sets of adjacent interdigitated slots having regions that abut one another to form a connected passageway through the adjacent interdigitated slots that define the respective hole. The powder metal bearing support insert is formed from a sintered powder metal material such that the powder metal bearing support insert has porosity to accommodate casting the powder metal bearing support insert into an engine component.

In some forms, the pair of holes may each have a respective central axis and the central axes of the pair of holes may be parallel with one another. The bearing-receiving surface may be semi-cylindrical in shape and may have a central axis. The central axis of the bearing-receiving surface may be perpendicular to the respective central axes of the pair of holes.

In some forms, the respective sets of adjacent interdigitated slots may be offset laterally inwardly from each of the pair of opposing ends. Each of the respective sets of adjacent interdigitated slots may create a set of alternating material bridges between a respective one of the pair of opposing ends of the body and a central section of the body in which the central section of the body is disposed between the pair of opposing ends. Each one of the set of alternating material bridges may include a passageway-defining surface that faces a central axis of the passageway and also faces oppositely from an adjacent passageway-defining surface on an adjacent one of the set of alternating material bridges.

In some forms, the body may be ferrous (made of iron or an iron alloy).

According to another aspect, an engine component includes a powder metal bearing insert as described above (including potentially various permutations of features and qualities described thereof) that is cast into a cast body.

In some forms, this engine component may be one of an engine casing, a cradle, and a bedplate (although is certainly not so limited to those components).

In some forms, the engine component may be cast from aluminum or an aluminum alloy and the powder metal bearing support insert may be ferrous.

In some forms, a material of the cast body may fill the pair of holes extending through the body of the powder metal bearing support insert. Still yet, holes may be drilled in the cast body which extend through the pair of holes of the body of the powder metal bearing support insert.

According to another aspect, a method of making a powder metal bearing support insert is disclosed. A tool and die set is filled with a powder metal. The powder metal is compacted using the tool and die set to form a compact in which the compact includes a body having pair of opposing ends on lateral sides of the body, a bearing-receiving surface positioned on a side of the body between the pair of opposing ends in which the bearing-receiving surface is for reception of a bearing therein, and a pair of holes extending through the body wherein each of the pair of holes are formed by sets of adjacent interdigitated slots having regions that abut one another to form a connected passageway therethrough that define the respective hole. The compact is sintered to form the powder metal bearing support insert.

In some forms, the powder metal bearing support insert is formed from a sintered powder metal material such that the powder metal bearing support insert may have porosity to accommodate casting the powder metal bearing support insert into an engine component.

In some forms, the pair of holes may each have a respective central axis in which the central axes of the pair of holes are parallel with one another. Additionally, the bearing-receiving surface may be semi-cylindrical in shape and have a central axis in which the central axis of the bearing-receiving surface is perpendicular to the respective central axes of the pair of holes. It is contemplated that, in some forms, the step of compacting the compact may occur in a direction perpendicular with the central axes of the pair of holes or parallel to the central axis of the bearing-receiving surface.

In some forms, the step of compacting may include forming the respective sets of adjacent interdigitated slots using interdigitated tool members and the respective sets of adjacent interdigitated slots may be offset laterally inwardly from each of the pair of opposing ends. In some of these forms, a distal powder-contacting end of each tool members of the interdigitated tool members may compact the powder metal to form a set of alternating material bridges between a respective one of the pair of opposing ends of the body and a central section of the body in which the central section of the body is disposed between the pair of opposing ends. Each one of the set of alternating material bridges may include a passageway-defining surface that faces a central axis of the passageway and faces oppositely from an adjacent passageway-defining surface on an adjacent one of the set of alternating material bridges.

According to still another aspect, a method of casting at least one powder metal bearing support insert (as described above and herein) into an engine component is disclosed. The method includes casting at least one powder metal bearing support insert into the engine component. As noted above, it is contemplated that the engine component could be, for example, an engine casing, a cradle, and a bedplate, although it is not so limited.

In some forms, the method may further include the step of drilling holes in a cast body of the engine component in which the drilled holes extend into the pair of holes of the body of the powder metal bearing support insert.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figure 1:
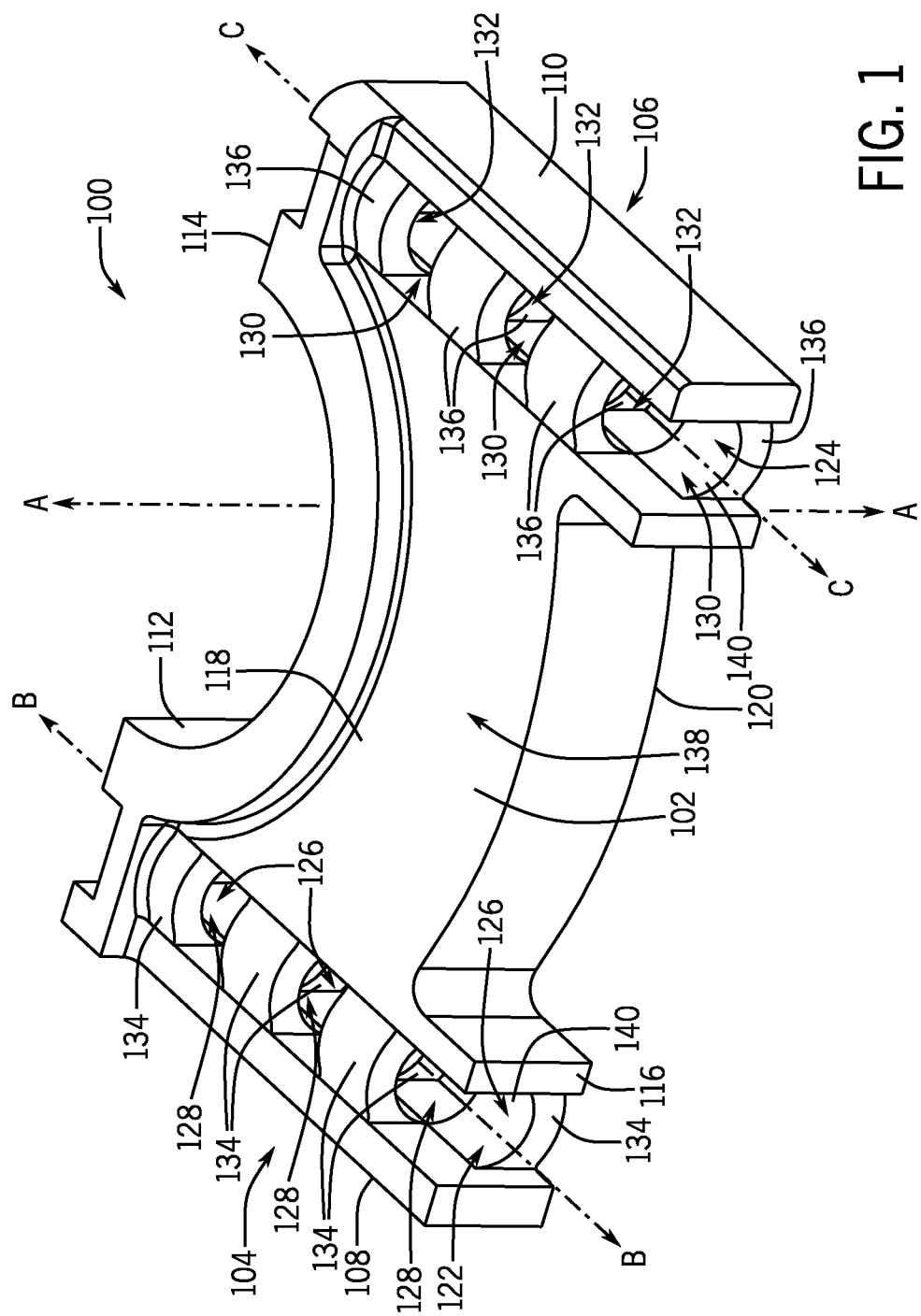
FIG. 1 is perspective view of a powder metal bearing support insert.
Figure 2:
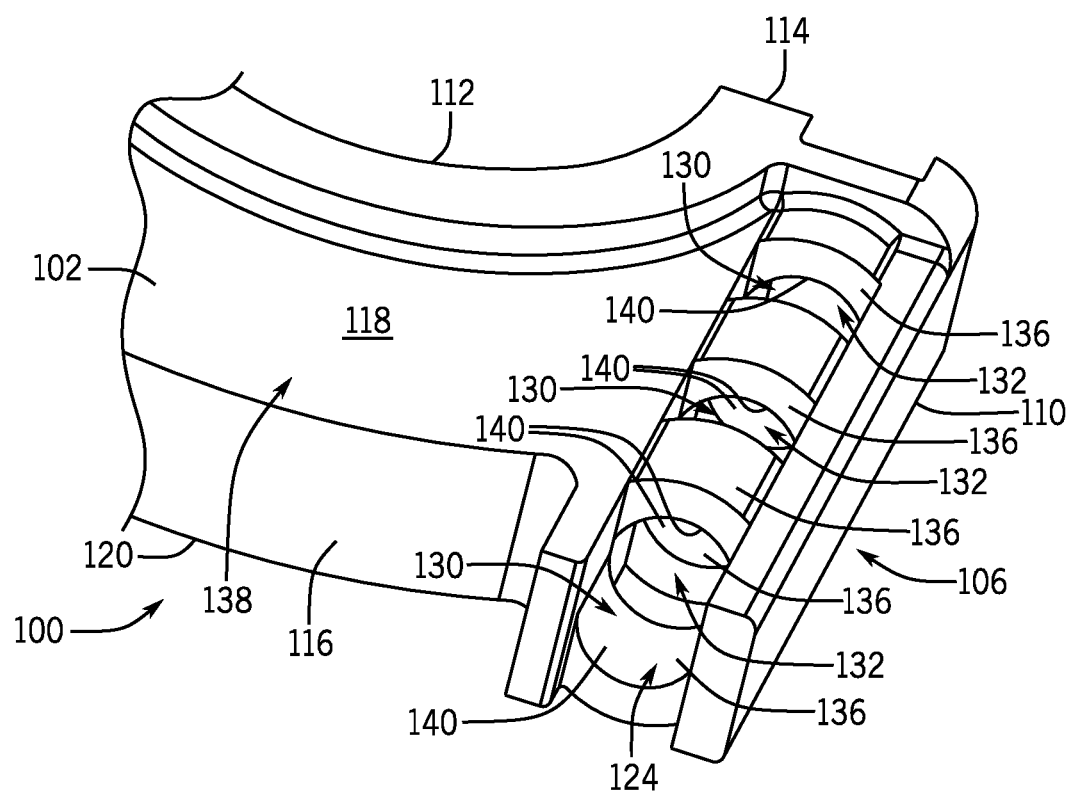
FIG. 2 is another perspective view of a portion of a powder metal bearing support insert of FIG. 1 showing one of the lateral ends but not the other.
Figure 3:
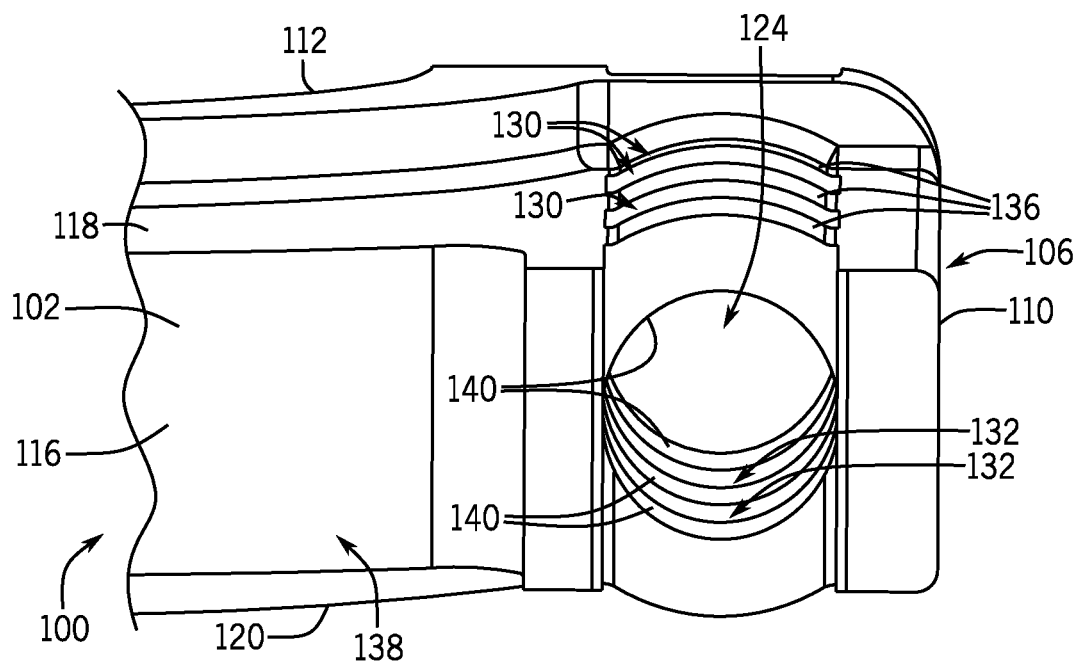
FIG. 3 is still another perspective view of a portion of a powder metal bearing support insert of FIG. 1 looking axially down the passageway formed by one of the sets of adjacent interdigitated slots.

Referring first to FIGS. 1 through 3, an exemplary powder metal bearing support insert 100 is illustrated which may be cast in, for example, and engine component such as an engine casing, a cradle, and a bedplate.

The powder metal bearing support insert 100 includes a body 102 which is formed using powder metallurgical processes that will be described in greater detail below. In brief, powder metal is compacted into a compact having a near net shape of this body 102 and that powder metal compact is then sintered to form the illustrated insert 100. In the form illustrated, the powder metal component is ferrous, meaning it is iron or an iron alloy, and it is ultimately cast in an engine component that is aluminum or an aluminum alloy. Because the body 102 of the powder metal bearing support insert 100 is formed from a sintered powder metal material, the powder metal bearing support insert 100 may have porosity to accommodate casting the powder metal bearing support insert 100 into the engine component (i.e., the cast material fills and interlocks to some extent in the extremely small pores of the body 102 in addition to some of the macroscopic features of the insert 100).

As illustrated, the body 102 extends between a pair of opposing ends 104 and 106 on the respective lateral sides 108 and 110 of the body 102. The body 102 also has a bearing-receiving surface 112 positioned on a proximal side 114 of the body 102 between the pair of opposing ends 104 and 106 ("proximal" in this context being used to describe proximity to the bearing). This bearing-receiving surface 112 is adapted for reception of a bearing (not shown) in the bearing-receiving surface 112 and, as illustrated, is semi-cylindrical having a central axis A-A. In use, a bearing cap may be coupled to the proximal side 114 to further define the bearing-receiving opening (usually circular cylindrical in shape) in conjunction with the bearing-receiving surface 112. The body also has a distal side 116 which will be embedded in the casting and a pair of axially-facing sides 118 and 120 bounded by the lateral sides 108 and 110, the proximal side 114, and the distal side 116 (the term "axial" in this context referring to the axis of the bearing-receiving surface 116.

Notably, a pair of holes 122 and 124 extends through the body 102. Each of the holes 122 and 124 have a central axis B-B and C-C, respectively, which are parallel with one another and which are perpendicular to central axis A-A of the bearing-receiving surface 112. One of the holes 122 is positioned near the lateral side 108, while the other of the holes 124 is positioned near the other lateral side 110 such that the holes 122 and 124 are positioned on opposite sides of the bearing-receiving surface 112.

Each of the pair of holes 122 and 124 are formed by sets of adjacent interdigitated slots (sets of slots 126 and 128 for the hole 122 and sets of slots 130 and 132 for the hole 124). Each of the slots have regions that abut one another to form a connected passageway through the slots 126 and 128 or slots 130 and 132 that defines the respective hole 122 or 124.

Each of the respective sets of adjacent interdigitated slots 126 and 128 or 130 and 132 are offset laterally inwardly from a respective one of the pair of opposing ends 104 or 106. As can be seen in FIGS. 1 through 3, this means that each of the respective sets of adjacent interdigitated slots 126 and 128 or 130 and 132 create a respective set of alternating material bridges 134 or 136 between a respective one of the pair of opposing ends 104 or 106 of the body 102 and a central section 138 of the body 102 in which the central section 138 of the body 102 is disposed between the pair of opposing ends 104 and 106.

Each bridge in the set of alternating material bridges 134 and 136 include a passageway-defining surface (generally indicated by the reference numeral 140) that faces the respective central axis B-B or C-C of the respective passageway and also faces oppositely from an adjacent passageway-defining surface on an adjacent material bridge of the set of alternating material bridges. In the case of the bridges on the end of the set of bridges, there will be only a single adjacent passageway-defining surface because there is only a single adjacent bridge. However, for all other non-end bridges there will be two adjacent bridges.

Figure 4:
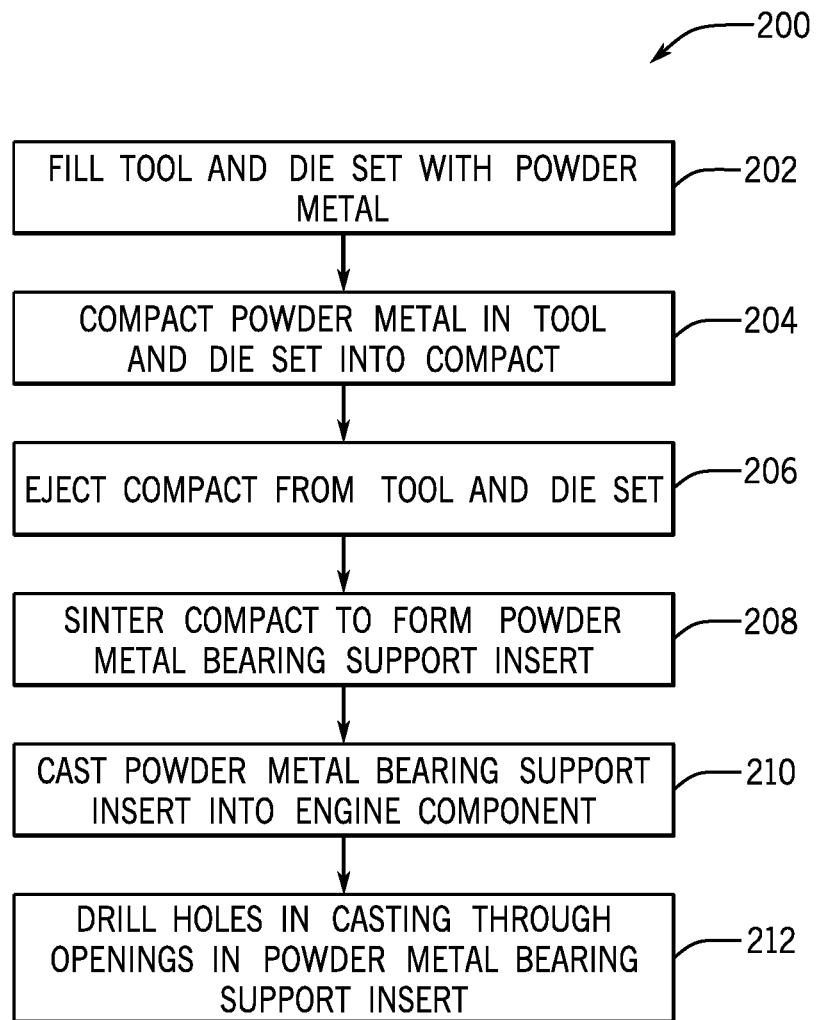
FIG. 4 is a block diagram outlining an exemplary method of making a powder metal bearing support insert and casting the powder metal bearing support insert to an engine component.

A powder metal bearing support insert 100 of this type can be produced and cast into an engine component according to the method 200 outlined in FIG. 4.

According to the method 200, a tool and die set in a press is first filled with a powder metal according to step 202. Normally, one or more tool members are inserted into the lower side of a die cavity to form a bottom and a feed shoe is moved over the cavity to fill the cavity with the powder metal. The term "powder metal" is used to describe a metallic powder along with any additives such as lubricants, binders, and waxes that may be blended with the metallic powder. For a powder metal bearing support insert, it is often the case that the metallic powder component of the powder metal will be ferrous, containing iron and/or alloying components.

With the tool and die set being full of powder, one or more upper tools descend and enter the upper side of the die cavity. As the upper and lower tool members are moved together and under the continued application of pressure from the press, the powder metal in the tool and die set is compacted to form the powder metal compact according to step 204.

In the mass production of powder metal parts, the compact is usually formed in a press using a tool and die set in which the upper and lower tool members are brought toward one another in a uniaxial fashion (i.e., both tool members travel along the same axis towards one another in opposing vertical directions) such that the powder metal is compacted between the upper and lower tool members. Note that for the insert 100, the pair of axially-facing sides 118 and 120 extend in a plane generally perpendicular to the axis of travel of the tool members, parallel to the axis A-A of the bearing-receiving surface 112 or perpendicular to the axes B-B and C-C of the holes 122 and 124.

Notably, given this orientation and that the direction of tool members is perpendicular to the direction of extension of the axes B-B and C-C of the holes 122 and 124, special accommodations need to be made to permit the compaction of an insert which has horizontal openings of this type. Such methods for forming a hole or holes perpendicular to the axis of compaction are explained in U.S. Pat. No. 7,625,522 ("the '522 patent) issued on Dec. 1, 2009 to GKN Sinter Metals, LLC which is incorporated by reference for all purposes as if set forth in its entirety herein. In the '522 patent, and in FIG. 3d in particular, a tooling arrangement is illustrated in which two tool member 351 and 221 have a region of abutting tool surfaces along a generally vertically extending direction in which the absence of powder metal creates an opening between the negative spaces left when tools 351 and 221 are withdrawn. As can be seen in FIG. 4 of the '522 patent, when multiple alternating slots are formed adjacent to one another, these slots can form a connected passageway defining an opening therethrough.

In the insert 100, the openings 122 and 124 are formed using tooling arrangements and methodologies similar to those taught in the '522 patent. In the illustrated insert 100, the pair of holes 122 and 124 are formed by sets of adjacent interdigitated slots 126 and 128 or 130 and 132 having regions that abut one another to form a connected passageway therethrough that define the respective hole 122 and 124.

In the illustrated embodiment, these groups of slots 126 and 128 or 130 and 132 are formed by interdigitated tool members during the compaction step 204 in which the respective sets of adjacent interdigitated slots 126 and 128 or 130 and 132 are offset laterally inwardly from the respective opposing ends 104 and 106. In this arrangement, a distal powder-contacting end of each tool members of the interdigitated tool members will compact the powder metal to form the respect set of alternating material bridges 134 and 136 between a respective one of the pair of opposing ends 104 and 106 of the body 102 and a central section 138 of the body 102 in which the central section 138 of the body 102. As noted above, each one of the sets of alternating material bridges 134 and 136 include a passageway-defining surface 140 that faces a central axis of the passageway (either axis B-B or C-C) and faces oppositely from an adjacent passageway-defining surface 140 on an adjacent one of the set of alternating material bridges 134 or 136.

After the compact is formed, the compact is ejected from the tool and die set according to step 206. Typically, the upper tool members are withdrawn from the die and the lower tool members raise the compact out of die cavity so that compact can be removed altogether from the tool and die set for further processing.

With the part ejected, the compact is then sintered to form the powder metal bearing support insert according to step 208. During sintering, the part is elevated to near a melting temperature of the powder metal such that the individual particles are fused together, usually by solid state diffusion in which the particles neck into one another. Typically, there is some amount of residual porosity in the sintered powder metal part. After sintering, the mechanical properties of the sintered part are greatly enhanced over the pressed compact, which was only loosely held together by the lubricant, binder, and wax along with some potential mechanical particle interlocking.

After the insert is sintered, the sintered bearing support insert may then be placed in a casting form into which a material is cast around the insert to form an engine component according to step 210. Because the sintered powder metal bearing support insert has some amount of porosity and because of the existence of the slots 126 and 128 or 130 and 132, when the material is cast around the insert, the material can fill some of the porosity and the slots to firmly lock the insert into the casting.

In some common usage cases, the powder metal insert may be ferrous (iron or an iron alloy) while the casting material is aluminum (aluminum or an aluminum alloy). This selection of materials provides a strong region for capturing the bearing (using the ferrous insert) and permits for a reduced weight of the overall engine component (which is a comparably lighter weight aluminum). Notably, in this arrangement during the step of casting, the cast material can fill the holes 122 or 124. This is in potential contrast to an insert formed without holes 122 or 124.

After casting, holes (such as holes 122 and 124) are drilled in a cast body of the engine component according to step 212. The drilled holes may extend into the pair of holes (e.g., holes 122 and 124 of the body 102 of the powder metal bearing support insert 100, but primarily involve the removal of the cast material in the holes 122 and 124 and not the sintered powder metal material. This provides a potential benefit because it can be easier to drill the cast material than the sintered powder metal material and, moreover, this drilling step may be performed using tooling that is used to machine or drill into other portions of the cast body. Effectively, this can eliminate the need for other tooling or bits to specifically drill the bolt holes in the insert apart from tooling that may already be employed for working the cast part.

After the engine component including the cast insert is drilled, the remainder of the engine may be assembled. Among other things, this can involve inserting a bearing into the bearing-receiving surface and securing it in place with a bearing cap to capture the bearing between the engine component and the bearing cap. Of course the particular details of the additional assembly steps will depend on the structure of the particular engine.

While an exemplary and representative insert and method are described above, one of ordinary skill in the art will appreciate that these are provided by way of example only. Modifications to these described inserts and methods are certainly contemplated as well as alternative designs. For example, the method might be revised to include additional steps, such as a post-compaction, pre-sintering burn off step or may involve additional pre-casting machining steps of the insert.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A powder metal bearing support insert for casting into an engine component, the powder metal bearing support insert comprising:
   a body having pair of opposing ends on lateral sides thereof;
   a bearing-receiving surface positioned on a side of the body between the pair of opposing ends, the bearing-receiving surface being adapted for reception of a bearing therein;
   a pair of holes extending through the body, wherein each of the pair of holes are formed by sets of adjacent interdigitated slots having regions that abut one another to form a connected passageway therethrough that define the respective hole;
   wherein the powder metal bearing support insert is formed from a sintered powder metal material such that the powder metal bearing support insert has porosity to accommodate casting the powder metal bearing support insert into an engine component.

2. The powder metal bearing support insert of claim 1 wherein the pair of holes each have a respective central axis and the central axes of the pair of holes are parallel with one another.

3. The powder metal bearing support insert of claim 2 wherein the bearing-receiving surface is semi-cylindrical in shape and has a central axis and wherein the central axis of the bearing-receiving surface is perpendicular to the respective central axes of the pair of holes.

4. The powder metal bearing support insert of claim 1 wherein the respective sets of adjacent interdigitated slots are offset laterally inwardly from each of the pair of opposing ends.

5. The powder metal bearing support insert of claim 4 wherein each of the respective sets of adjacent interdigitated slots create a set of alternating material bridges between a respective one of the pair of opposing ends of the body and a central section of the body in which the central section of the body is disposed between the pair of opposing ends.

6. The powder metal bearing support insert of claim 5 wherein each one of the set of alternating material bridges include a passageway-defining surface that faces a central axis of the passageway and also faces oppositely from an adjacent passageway-defining surface on an adjacent one of the set of alternating material bridges.

7. The powder metal bearing support insert of claim 1 wherein the body is ferrous.

8. An engine component comprising a powder metal bearing insert of claim 1 that is cast into a cast body.

9. The engine component of claim 8 wherein the engine component is one of an engine casing, a cradle, and a bedplate.

10. The engine component of claim 8 wherein the engine component is cast from aluminum or an aluminum alloy and the powder metal bearing support insert is ferrous.

11. The engine component of claim 8 wherein a material of the cast body fills the pair of holes extending through the body of the powder metal bearing support insert.

12. The engine component of claim 11 further comprising holes drilled in the cast body which extend through the pair of holes of the body of the powder metal bearing support insert.

13. A method of casting at least one powder metal bearing support insert of claim 1 into an engine component, the method comprising:
   casting the at least one powder metal bearing support insert into the engine component.

14. The method of claim 13 further comprising the step of drilling holes in a cast body of the engine component, the drilled holes extending into the pair of holes of the body of the powder metal bearing support insert.

* * * * *